United States Patent
Stewart et al.

(10) Patent No.: US 10,824,644 B2
(45) Date of Patent: Nov. 3, 2020

(54) AGGREGATE, INDEX BASED, SYNCHRONIZATION OF NODE CONTENTS

(71) Applicant: McAfee, LLC, Santa Clara, CA (US)

(72) Inventors: Brian Stewart, Idaho Falls, ID (US); Howard D. Stewart, New Port Richey, FL (US); Brian Roland Rhees, Saratoga Springs, UT (US); Seth D Grover, Idaho Falls, ID (US); Pablo Michelis, San Jose, CA (US)

(73) Assignee: Mcafee, LLC, Santa Clara, CA (US)

( * ) Notice: Subject to any disclaimer, the term of this patent is extended or adjusted under 35 U.S.C. 154(b) by 294 days.

(21) Appl. No.: 15/868,651

(22) Filed: Jan. 11, 2018

(65) Prior Publication Data
US 2018/0260467 A1   Sep. 13, 2018

Related U.S. Application Data

(60) Provisional application No. 62/468,241, filed on Mar. 7, 2017.

(51) Int. Cl.
*G06F 16/00* (2019.01)
*G06F 16/27* (2019.01)
(Continued)

(52) U.S. Cl.
CPC .......... *G06F 16/275* (2019.01); *G06F 16/178* (2019.01); *G06F 16/2228* (2019.01);
(Continued)

(58) Field of Classification Search
None
See application file for complete search history.

(56) References Cited

U.S. PATENT DOCUMENTS

| 6,480,839 B1 | 11/2002 | Whittington et al. |
| 7,647,326 B2 | 1/2010 | Shivaji-Rao et al. |

(Continued)

OTHER PUBLICATIONS

International Searching Authority, "Search Report and Written Opinion," issued in International Applicatio No. PCT/US2018/015100, dated Mar. 15, 2018, 13 pages.
(Continued)

*Primary Examiner* — Son T Hoang
(74) *Attorney, Agent, or Firm* — Hanley, Flight & Zimmerman, LLC

(57) ABSTRACT

A method includes receiving a first index of records in a first table and a second index of records in a second table. Each index entry of the indexes includes an aggregate value associated with the data in its respective record. The method further includes determining that the first table is inconsistent with the second table by comparing the aggregate values of a pair of indicator index entries of the indexes. The method further includes identifying a first pair of corresponding index entries from the indexes for which the aggregate values of the corresponding index entries are inconsistent and synchronizing records corresponding to the first pair of corresponding index entries. The method further includes updating the aggregate values of the index entries of the indexes and comparing the updated aggregate values of the pair of indicator index entries to determine whether the first table and the second table are consistent.

17 Claims, 8 Drawing Sheets

(51) Int. Cl.
*G06F 16/22* (2019.01)
*G06F 16/901* (2019.01)
*G06F 16/178* (2019.01)

(52) U.S. Cl.
CPC ...... *G06F 16/2246* (2019.01); *G06F 16/2255* (2019.01); *G06F 16/27* (2019.01); *G06F 16/9014* (2019.01)

(56) References Cited

U.S. PATENT DOCUMENTS

| | | |
|---|---|---|
| 7,647,329 B1 | 1/2010 | Fischman et al. |
| 8,412,713 B2 | 4/2013 | Stewart et al. |
| 8,725,705 B2* | 5/2014 | Hirsch ................ G06F 11/1453 707/698 |
| 8,954,407 B2 | 2/2015 | Hrle et al. |
| 9,418,131 B1 | 8/2016 | Halevi et al. |
| 2004/0133591 A1* | 7/2004 | Holenstein .......... G06F 11/2064 |
| 2009/0006495 A1 | 1/2009 | Ramasubramanian et al. |
| 2010/0198830 A1 | 8/2010 | Stewart et al. |
| 2016/0147618 A1 | 5/2016 | Lee et al. |
| 2016/0378752 A1* | 12/2016 | Anderson ............. G06F 16/245 707/747 |
| 2017/0177658 A1* | 6/2017 | Lee ..................... G06F 11/1451 |
| 2018/0144817 A1* | 5/2018 | Lofgren .................. A61M 5/14 |

OTHER PUBLICATIONS

Patent Cooperation Treaty, "International Preliminary Report on Patentability," issued in connection with International Patent Applicaiton No. PCT/US2018/015100, dated Sep. 10, 2019, 8 pages.

\* cited by examiner

AGGREGATE, INDEX BASED, SYNCHRONIZATION OF NODE CONTENTS

TECHNICAL FIELD

Embodiments described herein generally relate to data access, data manipulation, and data synchronization techniques. More particularly, embodiments described herein relate to data access, data manipulation, and data synchronization techniques that utilize enhanced indexing techniques.

BACKGROUND ART

Distributed/scaled data management solutions (also referred to as "Big Data" or "Big Data Analytics") refers to computerized solutions for examining large data sets to assist with decision making. For example, big data analytics can assist with uncovering hidden patterns, unknown correlations, trends, preferences and other useful information, which can in turn assist individuals or organizations with making decisions. These decisions include, but are not limited to, decisions about marketing, revenue generation, customer service, crime fighting, disease prevention, research and development, and any other activity that benefits from increased data.

In today's world, data sets grow rapidly. This rapid growth can be attributed to the relatively easier manner in which data is gathered and/or produced. Data is increasingly gathered and/or produced by numerous programmable devices that are communicatively connected to each other. For example, Internet-of-Things (IoT) devices that are wirelessly connected to each other and other computing devices (e.g., nodes, servers, etc.).

In general, big data is stored in databases that are maintained by a database management system. The databases and the system can be part of a distributed system that includes one or more clusters. In computing architecture, a cluster refers to a group of interconnected nodes (e.g., network-connected computing systems, network-connected data stores, etc.). A cluster is arranged to provide facilities such as balancing the load of processing many simultaneous computational tasks, high availability of resources such as data or application programs or parallel processing. High availability (HA) clusters are arranged to ensure the availability of the services provided by the cluster and may be implemented with redundant or replicated nodes (hereinafter "replicated nodes").

Replicated nodes assist with ensuring consistency for high availability purposes to ensure a reliable system. Due to hardware, network, or any number of failures, independent but replicated nodes can become out of synchronization. To resolve this issue, the replicated nodes may be regularly checked for consistency and, any located inconsistencies are resolved by transferring data between the nodes until consistency is achieved. Efficiently moving data across the network to resolve inconsistencies without creating an unnecessary network load may be difficult.

Efficient data synchronization has two requirements: (1) transfer only necessary data (e.g., records, files, etc.) in a fast and accurate manner; and (2) avoid taxing node resources in an attempt to identify the necessary data. The challenge, therefore, is to balance these requirements so as to make the process of data synchronization as transparent to the cluster as possible.

Many currently available Big Data solutions either transfer more data than is necessary due to the inability to identify exactly which data needs to be synchronized or excessively tax node resources in order to locate the exact records that need to be synchronized.

DESCRIPTION OF EMBODIMENTS

Figure 1:
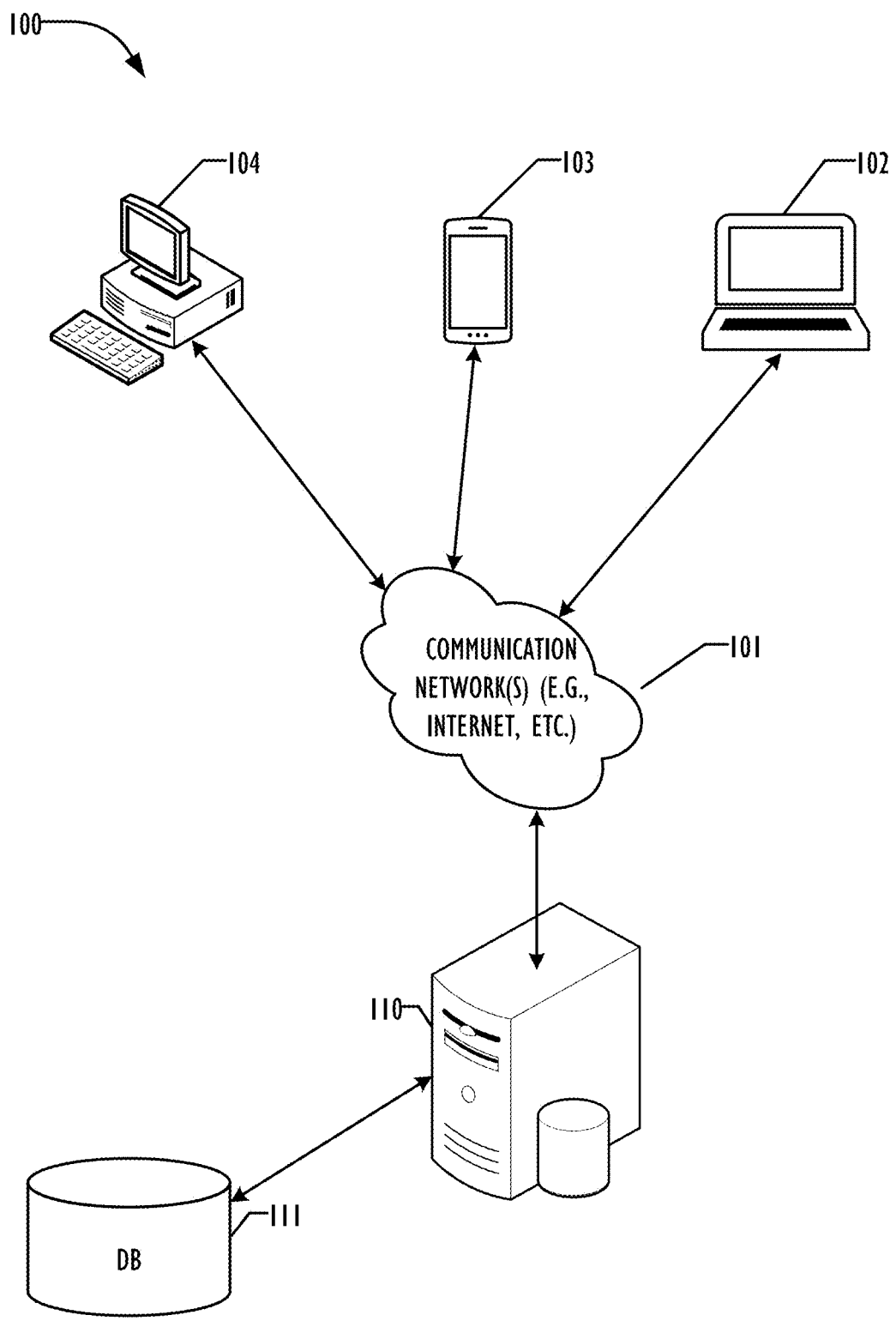
FIG. 1 is a pictorial diagram of a web server system comprising a single node, according to one or more embodiments disclosed herein.

Embodiments described herein relate to using a consistency validation system to identify inconsistent data (e.g., records, files, etc.) in nodes and correct the inconsistencies in a near transparent manner. As such, one or more of the embodiments described herein provides an alternative to at least one currently available data management solution that transfers more data than is necessary or excessively taxes node resources during data synchronization operations. Consequently, at least one of the embodiments described herein is directed to improving computer functionality. In particular, at least one of the embodiments described herein can assist with one or more of the following: (i) precise identification of inconsistent data (e.g., records, files, etc.), which can in turn reduce or eliminate transferring more data than is necessary; and (ii) minimizing the resources (computational, human, and financial) associated with locating data that needs to be synchronized, which can in turn reduce or eliminate the tax placed on node resources. Other improvements to computer functionality are evident from the detailed description, claims, and the figures.

In the following description, for purposes of explanation, numerous specific details are set forth in order to provide a thorough understanding of the embodiments described herein. It will be apparent, however, to one skilled in the art that the embodiments described herein may be practiced without these specific details. In other instances, structure and devices are shown in block diagram form in order to avoid obscuring the embodiments described herein. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter in the embodiments described herein. As such, resort to the claims is necessary to determine the inventive subject matter in the embodiments described herein. Reference in the specification to "one embodiment," "an embodiment," "another embodiment," or their variations means that a particular feature, structure, or characteristic described in connection with the embodiments is included in at least one of the embodiment described herein, and multiple references to "one embodiment," "an embodiment," "another embodiment," or their variations should not be understood as necessarily all referring to the same embodiment.

As used herein, the term "programmable device" and its variations refer to a physical object that includes electronic components configured to receive, transmit, and/or process data information. For one embodiment, one or more of the electronic components may be embedded within the physical object, such as in wearable devices and mobile devices (e.g., self-driving vehicles). For one embodiment, the device may also include actuators, motors, control functions, sensors, and/or other components to perform one or more tasks without human intervention, such as drones, self-driving vehicles, and/or automated transporters. The programmable device can refer to a computing device, such as (but not limited to) a mobile computing device, a lap top computer, a wearable computing device, a network device, an internet of things (IoT) device, a cloud computing device, a vehicle, a smart lock, etc.

As used herein, the terms a "program," a "computer program," an "application," and their variations refer to one or more computer instructions that are executed by a programmable device to perform a task. Examples include, but are not limited to, software and firmware.

As used herein, the term "communication network" and its variations refer to communication technology that enables a collection of interconnected programmable devices to exchange data with each other. Examples of communication networks include, but are not limited to, any type of data or communication network such as a local area network (LAN), a wide area network (WAN) such as the Internet, a fiber network, a storage network, or a combination thereof, wired or wireless. The communication network(s) also include networking hardware (e.g., switches, gateways, routers, network bridges, modems, wireless access points, networking cables, line drivers, switches, hubs, repeaters, etc.).

As used herein, the term "a computer system" can refer to a single programmable device or a plurality of programmable devices working together to perform the function described as being performed on or by a computer system.

Typical methods for determining data consistency between tables include variations of hash tables or hash trees. While such solutions may be effective in determining data inconsistencies, they often require additional processes and/or resources that are not provided by the indexing techniques of the data management system that the solutions described herein. In addition, the recalculation of such hash trees, e.g., due to reconstruction or record insertion/modification, can impose a large cost, depending on the size of the data structures being hashed. Once such hash trees are constructed, the root node is used to determine if two data sets are consistent—both in terms of data content and position within the data structure. A user, therefore, can only determine if an entire data set is consistent and, if a dataset is found to be inconsistent, the user must perform a table scan to determine where the inconsistency is.

Various indexing solutions have been proposed for use in node consistency checking, e.g., those disclosed in U.S. Pat. No. 6,480,839 ("the '839 patent"), U.S. Pat. No. 8,412,713 ("the '713 patent"), and US 2010/0198830 ("the '830 publication"), each of which is hereby incorporated by reference in its entirety. Such solutions may allow for aggregate calculations regardless of the number of records stored in the database. Such indexes are also referred to herein as "Nitro Trees" or "N-Trees." These aggregates may be maintained in real-time as records are inserted, deleted, and/or modified. Building on those technologies, the techniques described herein are able to create improved specific, real-time indexes that allow for immediate determination as to whether or not two tables or relations within a single table schema are synchronized, i.e., consistent, at any point in time (or across any range of time). Such improved synchronization indexes are also referred to herein as "NitroSync Trees" or "NS-Trees."

With some embodiments of these unique NS-Trees, a user or system can instantly calculate whether all or a portion of two independent tables are consistent in terms of the data stored within the tables. The NS-Trees can, in some embodiments, also be used to quickly identify and transfer data between nodes or clusters of nodes without requiring a full index scan or database scan to determine what data needs to be synchronized. Embodiments of synchronization, as described herein, utilize one or more NS-Trees to pinpoint inconsistent data, which can in turn assist with reducing the burden placed on the node and/or the network.

According to some embodiments disclosed herein, with these unique NS-Tree indexes, a user or system may quickly calculate whether all or a portion of two independent tables are consistent, i.e., in terms of the data stored within the tables. For example, the system may maintain an NS-Tree index for each of the two independent tables. Each index element of the NS-Tree indexes described herein is comprised of various elements, e.g., a synchronization time (i.e., "sync time"), a primary key, a hash of the complete record itself, and an aggregate value associated with each index entry (e.g., an accumulated XOR value). Thus, each index entry, may possess the accumulated aggregate value of all prior index entries in the NS-Tree index. An aggregate value of an index entry of one of the NS-Trees may then be compared to an aggregate value of an index entry of the other NS-Tree to validate data consistency between the two independent tables.

Among the advantages of NS-Trees is the fact that they can be queried and validated very rapidly. NS-Trees may also be maintained in real-time and auto-adjusted with every record insertion, deletion, and/or modification. Further, there is no need for separate hashing algorithms or processes, as NS-Trees may be maintained through the natural indexing techniques of the database that the data is being stored in. NS-Trees also carry the added benefits of sub-tree comparison capabilities. In other words, due to the unique composition of the NS-Tree index, users can validate two data sets within a 'sub-range' of the entire data set (e.g., based on a specified time range) or over the entire data set. NS-Trees also obviate the need for performing a tree scan operation, and the results of any sub range may be returned nearly instantaneously. Consistency between nodes may also be validated through relative record position instead of absolute record position, as in hash trees. This provides the added flexibility to be able to perform consistency verification on a subset of data of two different tables.

NS-Tree indexes, for some embodiments, may also be applied to two entirely different (i.e., independent) clusters of nodes in potentially different data centers by taking the concepts and applying them at a 'federated' level to validate the consistency of two entirely separate clusters of nodes. At least one existing technology does not have this capability and cannot achieve the desired outcome as quickly and efficiently as the cluster-level NS-Trees described herein.

For some embodiments, NS-Tree indexes can assist with reducing or eliminating extensive file scans and lookup processes (which can be expensive) and providing precise identification records that are out of synchronization, which can assist with maximizing efficiency. NS-Tree indexes, therefore, can assist with synchronizing subsections of data (e.g., records, files, etc.) based on the flexibility that is inherent to NS-Tree indexes. For example, one generic synchronization technique locks two tables of database being synchronized before a file scan can be performed to detect data in the tables (e.g., records, etc.) that is out of synchronization. Once a potential discrepancy is found, a device or system associated with implementing the generic synchronization technique adds, deletes, or modifies that out-of-sync data from the tables and proceeds. Using this generic synchronization technique, the tables may be unavailable for the duration of the synchronization. Also, this generic synchronization technique can potentially copy large percentages of the file in very small pieces, which can be an inefficient usage of network bandwidth. Using NS-Trees indexes, the disclosed synchronization process can detect exactly where the discrepancies are and only adjust those areas while giving the user/system the ability to choose whether to lock the table or not (since the NS-Trees is continually and dynamically maintained).

For one embodiment, NS-Tree indexes can assist with providing the flexibility of synchronizing single records or entire files of records on an as-needed basis. This can assist with maximizing network bandwidth utilization. For a further embodiment, synchronizing single records or entire files of records can be performed while the database is up and running—that is, without locking the database. For another embodiment, synchronizing single records or entire files of records requires the locking of a database when large portions of the data are being copied, synchronized, modified, added, and/or deleted.

FIG. 1 is a pictorial diagram of a web server system 100 comprising a single node, according to one or more embodiments disclosed herein. The database 111 at the single node may be accessed by one or more users using web browsers executing within programmable devices 102-104 and communicating with web server 110 over communication network(s) 101. For the illustrated embodiment, the programmable device 104, for example, uses a web browser to communicate using the Hypertext Transfer Protocol (HTTP) communications protocol to send a Uniform Resource Locator (URL), which includes request information across communication network(s) 101 to web server 110. The request information included within the URL typically specifies a database request. The web server 110 may, in turn, process the URL to obtain the database request information to be supplied to the database 111, resulting in the invocation or resolution of the database request specified by the user.

When a database request is complete, web server 110 may generate a Hypertext Markup Language (HTML) representation of a web page (or other document) that has data, e.g., data corresponding to a result set, which was generated when the database request was applied to database 111. The exemplary HTML representation of the web page may then be transmitted back across the communication network(s) 101 to programmable device 104 for display to a user using the web browser. This process of sending a database request, generating the results, generating the HTML web page representation of the results, and returning the representation to the user may occur each time one or more of the programmable devices 102-104, communicates over the communication network(s) 101 to web server 110.

Each of the programmable devices 102-104 can be an internet of things (IoT) device, a mobile computing device, or a cloud computing device. Also, one or more of the devices 102-104 can include one or more electronic components. Examples of such components include: processing unit(s) (such as microprocessors, co-processors, other types of integrated circuits (ICs), etc.); corresponding memory; and/or other related circuitry. For one embodiment, and as shown in FIG. 1, at least one of the devices 102-104 can include an input device for capturing user inputs and data. One or more of the devices 102-104 can also include sensors for capturing data indicative of one or more environs. Additionally, one or more of the devices 102-104 can include an output device for presenting a user interface (e.g., a graphical user interface (GUI), any other type of user interface, etc.) to enable any of the other operations described herein.

The web server 110 includes one or more electronic components. Examples of these component(s) include: processing unit(s) (such as microprocessors, co-processors, other types of integrated circuits (ICs), etc.); corresponding memory (volatile memory, additional non-volatile memory, etc.); and/or other related circuitry. As such, the web server 110 can be any of various types of computers, including general-purpose computers, workstations, personal computers, servers, etc. In some embodiments, the web server 110 is associated with an input device for receiving inputs and/or an output device for presenting data to one or more users.

The web server 110 and/or at least one of the devices 102-104 can include a computer program (e.g., a mobile software application, etc.) installed thereon for performing one or more operations as described herein. In some embodiments, the web server 110 and/or at least one of the devices 102-104 include a logic/module for performing one or more operations as described herein. Such a logic/module can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. Processing units include, but are not limited to, an application specific integrated circuit (ASIC), an application-specific instruction set processor (ASIP), a field programmable gate array (FPGA), a digital signal processor (DSP), any type of processor, an embedded processor, a co-processor, or any other type of logic capable of processing instructions.

In some embodiments, the database 111 comprises an aggregation of data, including one or more files that each include one or more records or one or more tables of records. The database 111 can, in some embodiments, be a general data structure that is implemented in a storage space (e.g., a hard disc or memory) of a computer system (e.g., web server 110, another computer system, etc.) by using a database management program (DBMS).

FIG. 1 includes one or more communication networks 101, which may comprise one or more different types of communication networks, such as the Internet, enterprise networks, data centers, fiber networks, storage networks, WANs, and/or LANs. The communication networks 101 individually or in combination may provide wired and/or wireless connections between the web server 110 and/or at least one of the devices 102-104 that operate in the electrical and/or optical domain, and also employ any number of network communication protocols (e.g., TCP/IP). For example, one or more of the communication networks 101 may be a wireless fidelity (Wi-Fi®) network, a Bluetooth® network, a Zigbee® network, and/or any other suitable radio based network as would be appreciated by one of ordinary skill in the art upon viewing this disclosure. It is to be appreciated by those having ordinary skill in the art that the communication network(s) 101 may also include any required networking hardware, such as network nodes that are configured to transport data over communication networks 101. Examples of network nodes include, but are not limited to, switches, gateways, routers, network bridges, modems, wireless access points, networking cables, line drivers, switches, hubs, and repeaters.

One or more of the communication networks 101 may be configured to implement computer virtualization, such as virtual private network (VPN) and/or cloud based networking. For one embodiment, the web server 110 and/or at least one of the devices 102-104 comprise a plurality of virtual machines (VMs), containers, and/or other types of virtualized computing systems for processing computing instructions and transmitting and/or receiving data over communication network(s) 101. Furthermore, the web server 110 and/or at least one of the devices 102-104 may be configured to support a multi-tenant architecture, where each tenant may implement its own secure and isolated virtual network environment. Although not illustrated in FIG. 1, the web server 110 and/or at least one of the devices 102-104 may be configured to connect to a variety of other types of programmable devices, such as VMs, containers, hosts, storage devices, wearable devices, mobile devices, and/or any other device configured to transmit and/or receive data using wired or wireless communication networks 101.

Figure 2:
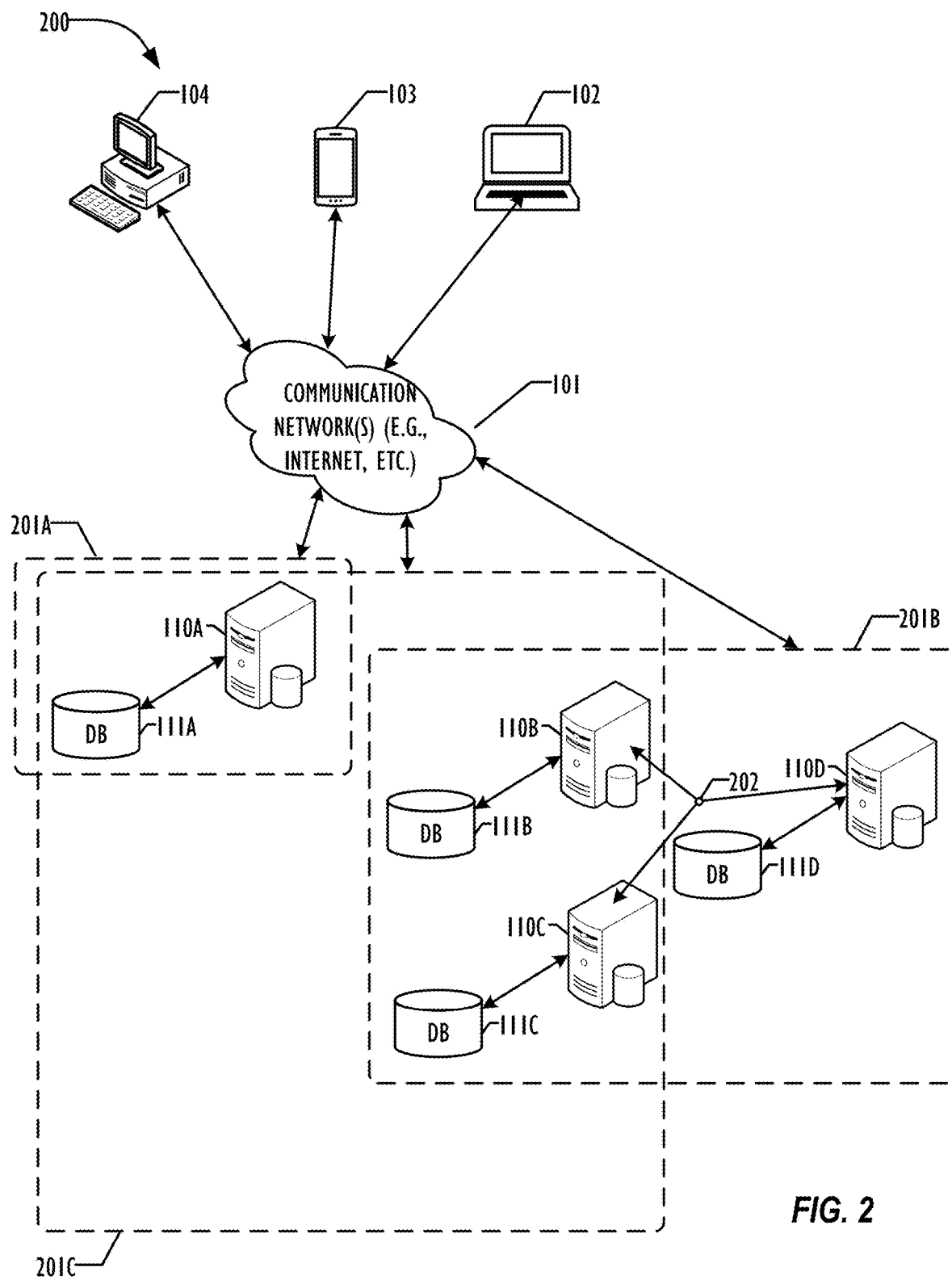
FIG. 2 is a pictorial diagram of a web server system comprising multiple clusters and multiple nodes, according to one or more embodiments disclosed herein.

FIG. 2 is a pictorial diagram of a web server system 200 comprising multiple clusters and multiple nodes according to one or more embodiments disclosed herein. FIG. 2 includes the programmable devices 102-104 of FIG. 1 and a node including a server 110A and a database 111A that correspond to the server 110 and the database 111A of FIG. 1, respectively. FIG. 2 further includes additional nodes that may, for example, be maintain a synchronized version of the database 111A that is in communication with the web server 110A. As shown in FIG. 2, the additional 'synchronized' nodes include: server 110B/database 111B; server 110C/database 111C; and server 110D/database 111D. A communication link 202 is shown as connecting each of the following nodes: server 110B/database 111B; server 110C/database 111C; and server 110D/database 111D into cluster 201B. The single server 110A/database 111A may also be logically grouped as an independent cluster 201A. In still other embodiments, clusters, such as a cluster 201C, may comprise nodes that are part of two or more other independent clusters and/or located at two or more different data centers, e.g., server 110A/database 111A; server 110B/database 111B; and server 110C/database 111C may be logically grouped into the cluster 201C. As will be described in greater detail below, disclosed herein enable consistency verification and synchronization between nodes using NS-Tree indexes. The techniques disclosed herein also allow for the performance of consistency verification on clusters of nodes (in potentially different data centers) by applying the NS-Tree indexes at a 'federated' level.

Figure 3:
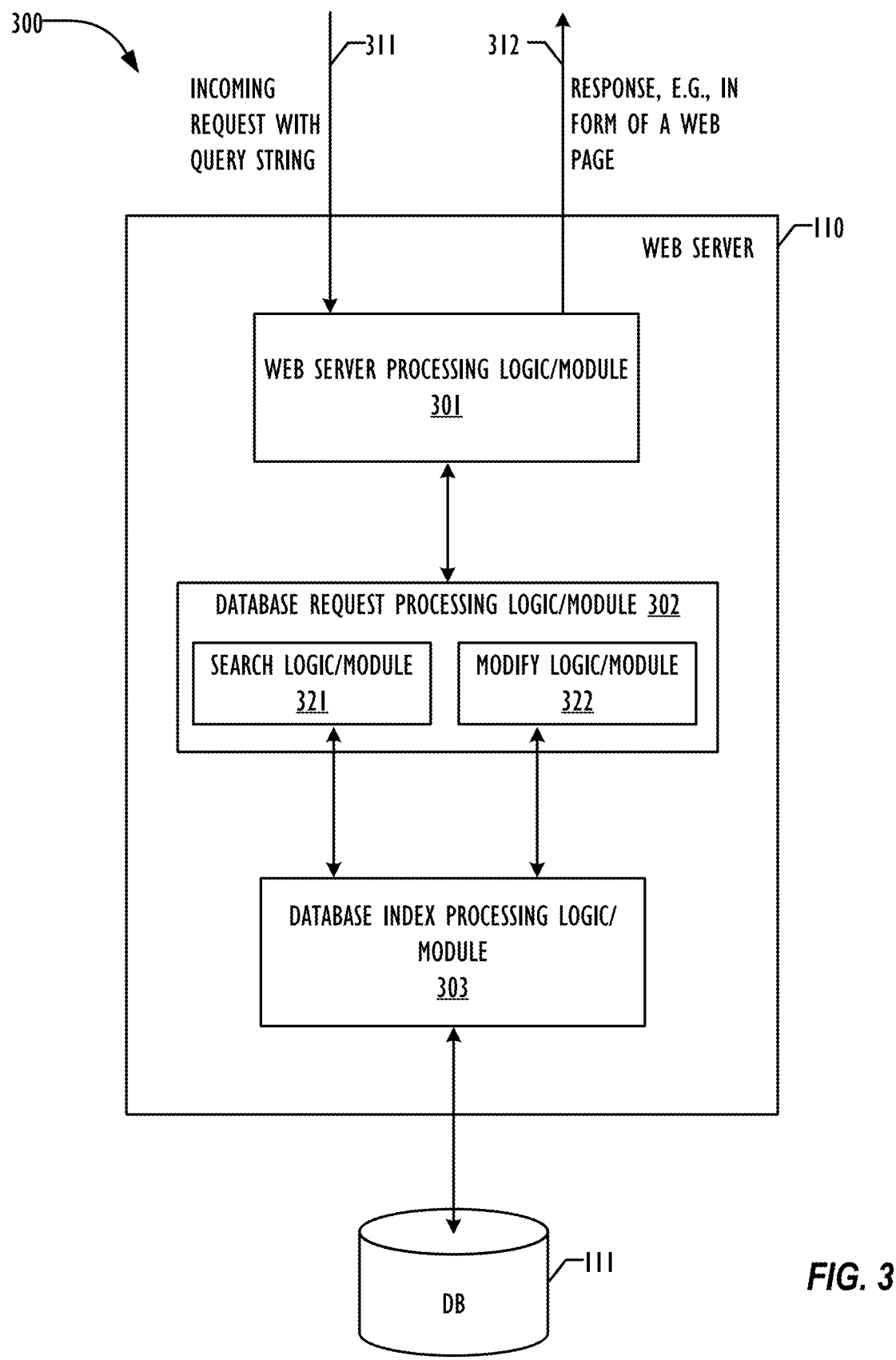
FIG. 3 is a block diagram of a web server computing system including an improved database, according to one or more embodiments disclosed herein.

FIG. 3 illustrates a block diagram of a web server computing system 300 that includes an improved database according to one or more embodiments disclosed herein. The web server computing system 300 includes the web server 110 and the data base 111 of FIG. 1. The web servers 110A-110D and the databases 111A-111D of FIG. 2 may include analogous components and function similarly to the web server 110 and the database 111, respectively. In the illustrated example, the web server 110 includes a plurality of processing logic/modules. Each of these logic/modules can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. Processing units include, but are not limited to, an application specific integrated circuit (ASIC), an application-specific instruction set processor (ASIP), a field programmable gate array (FPGA), a digital signal processor (DSP), any type of processor, an embedded processor, a co-processor, or any other type of logic capable of processing instructions.

The logic/modules in FIG. 3 can, for some embodiments, be used to receive a request 311 from users over the communication network(s) 101 and to generate a result 312 that is formatted in a specific manner (e.g., in HTML, etc.) and transmitted back to a user. In the illustrated example, these processing logic/modules include a web server processing logic/module 301, a database request processing logic/module 302, and a database index processing logic/module 303. The web server processing logic/module 301 receives the request 311 (e.g., an HTTP request, etc.) from a user and performs all the necessary processing needed to generate a database request that is to be applied to database 111. This request is then passed to a database request processing logic/module 302, in which the request is further processed for application against database 111. A part of this processing of the request may include processing within a database index processing logic/module 303. In the index processing logic/module 303, portions of the request may be applied to the database using previously generated indexes, e.g., N-Tree indexes or NS-Tree indexes. The indexes may be used to organize and arrange the data within fields and database records in some form of a sequential order. Processing logic/module 303 retrieves and stores various database records within database 111 as necessary.

The processing logic/modules 301-303 generate database requests based on each HTTP request received from a user. The processing logic/module 301-303 simultaneously processes the plurality of such HTTP requests, and thus, the processing logic/modules 301-303 operating in a multi-threaded environment permit multiple requests to the database 111 to occur simultaneously. These processing logic/modules 301-303 also handle conflict detection and resolution processing to permit the simultaneous reading of the database 111 while the database 111 may also be modified by a write request.

The database request processing logic/module 302 may also include a search logic/module 321 and a modify logic/module 322. The search logic/module 321 performs the processing associated with attempting to locate a request received from a user with data stored within a field in the database. This search logic/module 321 interacts with any indexes (e.g., B-Tree indexes, etc.) that are used to assist in the searching of the database. Similarly, the modify logic/ module 322 processes write requests that alter, add, and delete data stored within database 111. These changes are also reflected within data entries within any related indexes that assist in the searching of the database fields.

Figure 4:
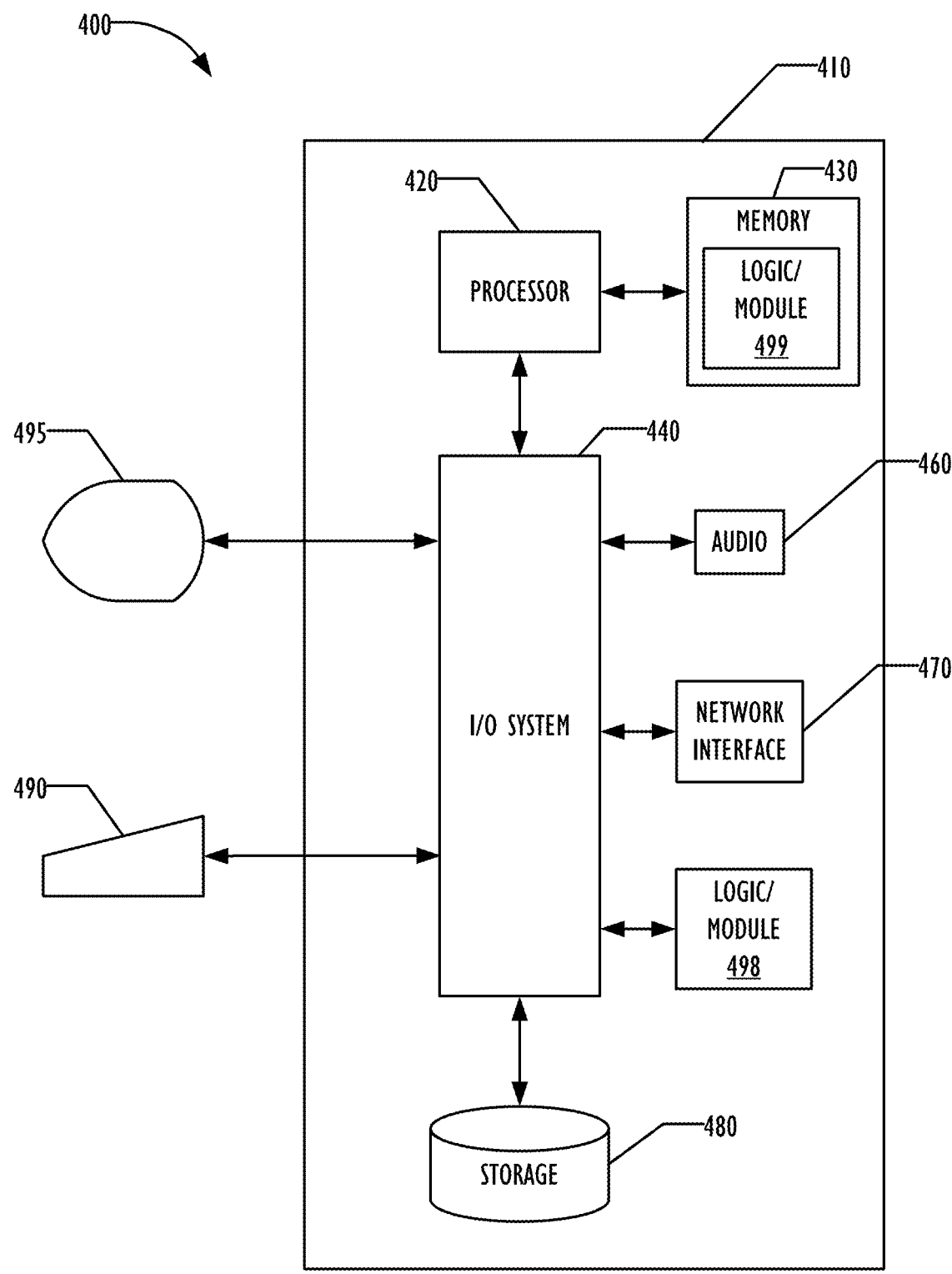
FIG. 4 is a block diagram illustrating a computer system for utilizing improved aggregate indexes for real-time verification of node contents, according to one or more embodiments disclosed herein.

FIG. 4 is a block diagram illustrating a computer system 400 that may be used to implement some or all of the techniques described herein. The computer system may 400 may correspond to the web server 110, one of the web servers 110A-D, the database 111, one of the databases 111A-D, or a combination thereof. A system unit 410 provides a location where components of the computer system 400 may be mounted or otherwise disposed. The system unit 410 may be manufactured as a motherboard on which various chipsets are mounted, providing electrical connection between the components and signal and power distribution throughout the system unit 410 and external to the system unit 410 as desired. For example, the computer system 400 may include an output device such as display 495, which provides a way to display alerts or other query results related to node synchronization and verification.

Figure 6:
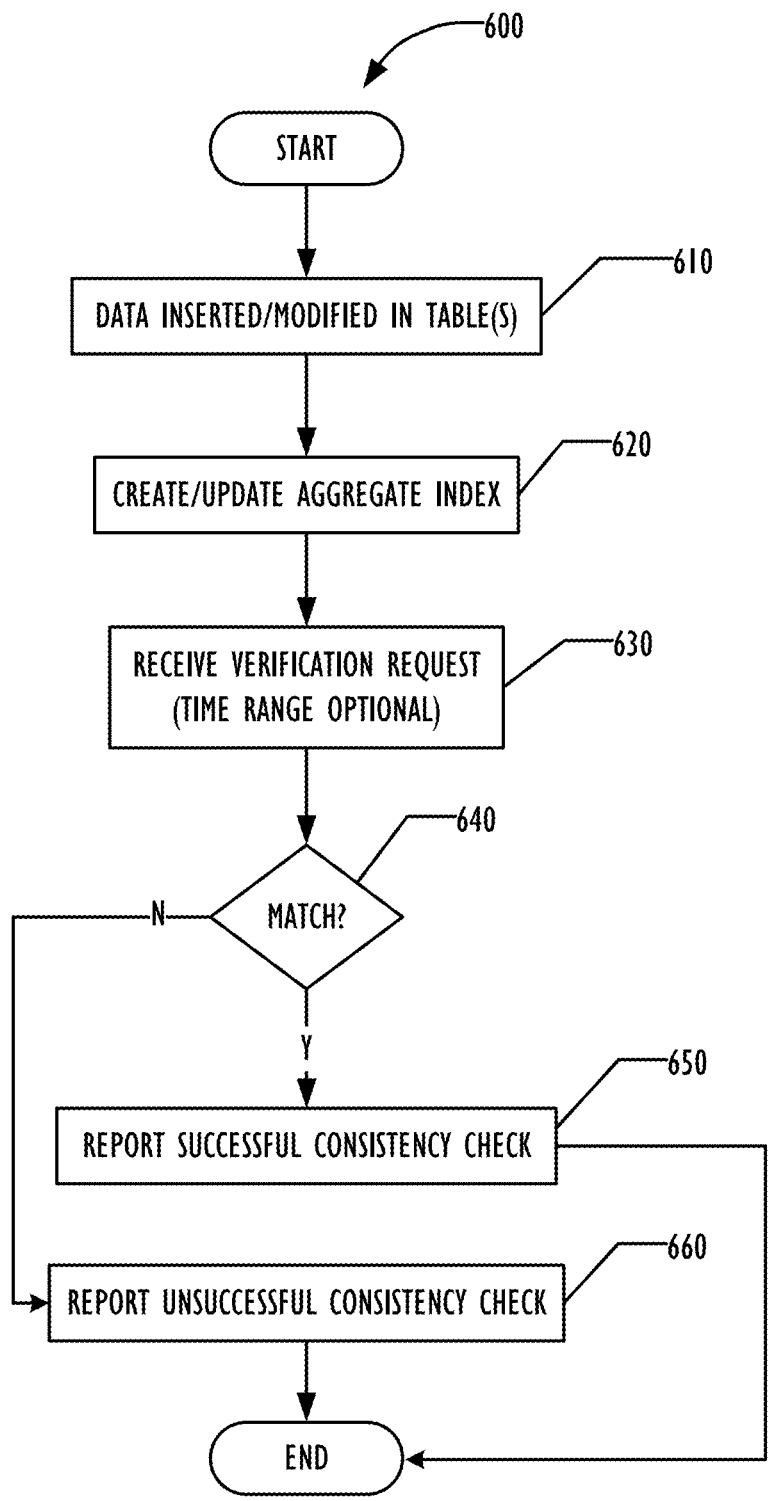
FIG. 6 is a flowchart illustrating a technique for utilizing improved aggregate indexes for real-time verification of node contents, according to one or more embodiments disclosed herein.

Various components of the system unit 410 may include one or more processors or processing units 420, typically each a single processor chip mounted in a mounting socket (not shown in FIG. 4) to provide electrical connectivity between the processors 420 and other components of the computer 400. Although a single processor 420 is illustrated in FIG. 4, any desired number of processors can be used, each of which may be a multi-core processor. Multiple processor chips are available on the market currently, and any desired processor chip or chipset may be used. The system unit 410 may be programmed to perform methods in accordance with this disclosure, an example of which is illustrated in FIG. 6.

The processor 420 is connected to memory 430 for use by the processor 420, typically using a link for signal transport that may be a bus or any other type of interconnect, including point-to-point interconnects. The memory 430 may include one or more memory modules and comprise random access memory (RAM), read only memory (ROM), programmable read only memory (PROM), programmable read-write memory, and solid-state memory. For some embodiments, the memory 430 includes a specialized logic/module 499, which can be a computer program (e.g., software, machine readable instructions, etc.) that may be executed by the processor 420 to perform one or more of the techniques described herein in connection with one or more of FIGS. 1-3 and 5-8. Examples of such techniques include data verification techniques and data synchronization techniques as described in connection with one or more of FIGS. 5-8. The processor 420 may also include internal memory, such as cache memory. In some embodiments, the logic/module 499 resides in the processor 420's internal memory. An operating system running on the processor 420 generally controls the operation of the computer system 400, providing an operating system environment for services, applications, and other software to execute on the computer 400.

As illustrated in FIG. 4, the processor 420 is also connected to an I/O subsystem 440 that provides I/O, timer, and other useful capabilities for the computer system 400. For example, the I/O subsystem 440 may provide I/O ports for connecting the optional display 495 and an optional input device 490, such as a keyboard, mouse, touch screen, to the system unit 410. The ports may be either one or more of special-purpose ports for components like the display 495 or multipurpose ports such as Universal Serial Bus (USB) ports for connecting the input device 490. The I/O subsystem 440 may also include an interface for communicating with storage devices such as storage device 480, connect to audio devices through an audio interface 460, and connect to the network 101 via network interface 470. The storage device 480 represents any form of non-volatile storage including, but not limited to, all forms of optical and magnetic, including solid-state storage elements, including removable media, and may be included within the system unit 410 or be external to system unit 410. The storage device 480 may be a program storage device used for storage of software to control the computer system 400, data for use by the computer system 400 (including network flow data), or both. Although only a single storage device 480 is illustrated in FIG. 4 for clarity, any number of storage devices 480 may be provided as desired, depending on interface availability. The I/O subsystem 440 may be implemented as one or more chips within the system unit 410. In some embodiments, the memory 430 may be connected to the I/O subsystem 440 instead of or in addition to the processor 420.

For some embodiments, the processor 420 is coupled to a specialized logic/module 498 via the I/O subsystem 440. For these embodiments, the logic/module 498 includes hardware, software, or a combination thereof for performing one or more of the techniques described herein in connection with one or more of FIGS. 1-3 and 5-8. Examples of such techniques include data verification techniques and data synchronization techniques as described in connection with one or more of FIGS. 5-8.

The computer system 400 may be any type of computing device, such as, for example, an IoT device, a smart phone, smart tablet, personal digital assistant (PDA), mobile Internet device (MID), convertible tablet, notebook computer, desktop computer, server, smart television, etc. The display 495, if present, may be any time of device for presenting an interface to the user, such as, for example, a touch screen, or a liquid crystal display. The elements illustrated in FIG. 4 are illustrative and given by way of example only. The elements shown in FIG. 4 may be combined or divided into multiple elements as desired. Other elements, such as geo-positioning logic provided by a Global Positioning System (GPS) transceiver, as well as logic for handling mobile communications using standards such as, for example, IEEE 802.11, IEEE 802.16, WiMAX, etc., may also be provided as desired.

Figure 5:
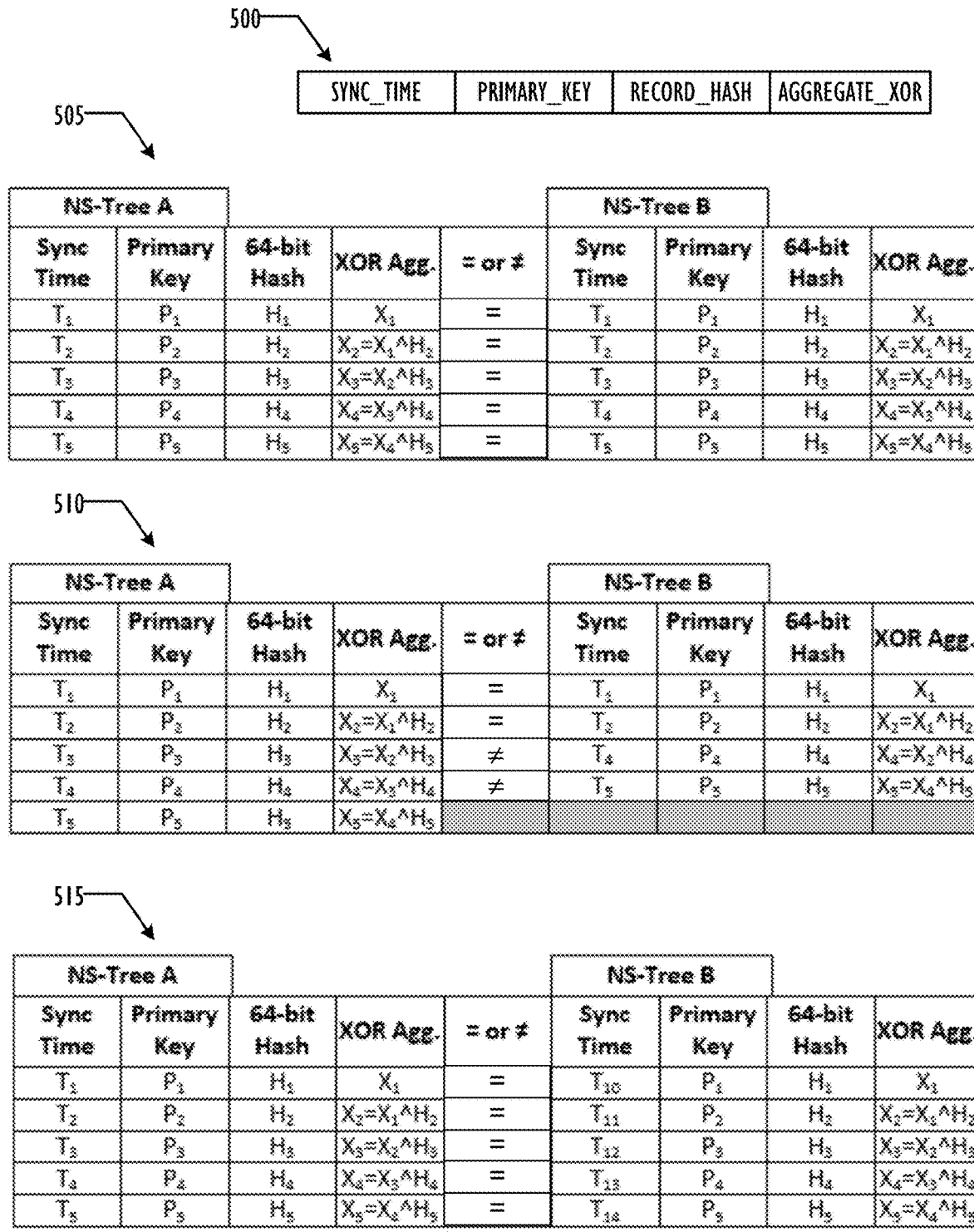
FIG. 5 is a set of exemplary tables utilizing improved aggregate indexes for real-time verification of node contents, according to one or more embodiments disclosed herein.

Turning now to FIG. 5, a set of exemplary tables utilizing improved aggregate indexes for real-time verification of node contents are illustrated, according to one or more embodiments disclosed herein. According to some embodiments, NS-Tree indexes comprise a specialized form of index entry having a composition that is uniquely architected to validate consistency between the data of two separate tables based on the same schema. The composition of the NS-Tree index entry may, e.g., be: a sync time, a primary key, a record hash, and an aggregate accumulated value.

Each element of the exemplary NS-Tree index entry (500) referred to above will now be described in greater detail:
  "SyncTime": The time (e.g., the last modified time) associated with the record associated with the index entry 500. In some embodiments, the SyncTime may be a 4-byte value.
  "Primary Key": The primary key value of the record (or the auto-increment field, if it exists). If this field of the index entry corresponds to an auto-increment field, a system or user may separately ensure that field values of NS-tree indexes are consistent across nodes/shards. According to some embodiments, a table must have a primary key in order to be synchronized.

"Record Hash": The record hash is the hash of the record. In some implementations, all fields may be included by default in the record's hash (with the exception of the SyncTime and/or the auto-increment fields, if the auto-increment fields are not the primary key chosen for the Primary Key field). Individual fields of the record may be excluded from the hash, e.g., as specified through an application programming interface (API) by the user. According to some embodiments, the record hash may be a 64-bit or 128-bit value.

"Aggregate": The aggregate value is a running, accumulated value reflective of the hashes of each entry in the NS-Tree index up to the NS-Tree index entry 500. In some embodiments, the Aggregate field may comprise an 'XOR Aggregate' field, i.e., the result of XOR'ing all the hashes of the entries in the NS-Tree index up to the point of questions-Tree index entry 500.

An NS-Tree may be created and/or maintained when, e.g.: 1.) an API requests the system to build the NS-Tree; 2.) an SQL statement is executed against the NS-Tree; 3.) an API requests to determine if two (or more) tables are synchronized; or 4.) an API requests that two (or more) tables be synchronized.

As records are inserted into the database, the NS-Tree index may be maintained, along with any other pre-defined table indexes. The sync time of the record (i.e., the first columns in the NS-Trees A and B of table 505) may be determined by the database at the time of write (or at the time of record creation) on a client. This ensures relative record position within the NS-Tree and allows for complex consistency validation queries to be executed against multiple tables, nodes, or shards.

The primary key (i.e., the second columns in the NS-Tree indexes A and B of table 505) may be used for record validation as well as positional awareness with in the NS-Tree index. A hash of the record may then be created and stored in the index entry (i.e., the third columns in the NS-Trees A and B of table 505), and an additional value may then be calculated, which may be used in the Aggregate section of the index entry (i.e., the fourth columns in the NS-Trees A and B of table 505). According to some embodiments of NS-Trees, the Aggregate value may be calculated by XOR-ing the hash of the record stored in the current index entry with the previous index entry's XOR calculation. These values may then be calculated and maintained in real-time as index entries are inserted, deleted, and/or modified. Inconsistencies between data tables indexed by NS-Tree indexes (e.g., NS-Tree A and NS-Tree B in table 505) may then be easily detected in the NS-Tree indexes, as shown, e.g., in the fifth column of table 505 in FIG. 5, which is labeled "= or ≠". In table 505, the aggregate value of each of the index entries of NS-Tree A matches the aggregate value of the corresponding index entry of NS-Tree B, so the system may verify that the relevant data stored in the tables A and B is currently consistent. It should be noted that corresponding index entries having matching aggregate values indicates both that the records of the corresponding indexes are consistent and that all records corresponding to previous indexes are consistent. Accordingly, the system may determine that the table A is consistent with the table B up to a particular pair of records by performing a single comparison of index entries in a position corresponding to the particular pair of records. To illustrate, the system may determine that table A is consistent with table B by performing a single comparison of the index entries in a last position (e.g., $T_5$) of the NS-Trees A and B.

By contrast, table 510 in FIG. 5 shows two NS-Trees A and B that are out of synchronization, based on the accumulated XOR value (e.g., the third and fourth row entries of the tables are not equal). In tables 505 and 510, the consistency between NS-Tree A and NS-Tree B can easily be determined by simply comparing the XOR aggregate values at a last position (e.g., $T_5$) of each tree. Using the various indexing and aggregate accumulation capabilities described above, the XOR aggregate may be dynamically maintained, regardless of whether record entries are being added, modified, or deleted. In other words, there is no need for a reconstruction of the NS-Tree with each addition, modification, and/or deletion.

Tables that are checked for consistency are frequently in a 'dirty' or ever-changing state. Many applications, e.g., 'Big Data' applications, may require regular validation of consistency between tables/relations. Time-series applications, for example, insert data in a monotonically increasing fashion. Ensuring the consistency of the data in real-time in such applications may be inaccurate, e.g., due to the varying times of insertion of the data. However, NS-Trees are capable of validating consistency based on time. For example, a user may specify a start time or a sub-time range where consistency validation is desired. This allows for scaled systems to reach eventual consistency and then be checked for data integrity between relations.

In Table 505, for example, consistency may be validated at any time within the NS-tree indexes A and B. The sync time in each index entry in the NS-Tree may be queried, as any index in the database and exact positions can be readily identified. The sync time value in each NS-Tree entry may then be used to ensure the relative position of every entry within the tree.

Table 515 is an example of ensuring consistency with varying sync times between trees. Notice that the sync times in table 515 are not consistent between the two NS-Trees A and B in this example. The consistency checking process may be used to normalize the sync times between the trees, and the primary key may be used to determine relative positions of index entries within the NS-Trees. The XOR aggregate values may then be used at any point within the tree to ensure consistency between NS-Trees. This also allows for relations of varying sizes to ensure data consistency between subsets of the relations.

The NS-Tree embodiments described above may be applied to various types of tables, such as dimension tables and "data partitioned" tables (i.e., data tables partitioned by a field value or time). A system may maintain a single NS-Tree per dimension partitioned table and perform consistency validation checks, as explained above. By contrast, the system may maintain a separate NS-Tree index for each data partition of a data partitioned table. The NS-Tree indexes of the partitions may overlap in terms of the partitioning value (e.g., index the same fields and/or times).

Since relative position may be used in the NS-Tree to determine primary key and hash validation, the consistency algorithm may generate a "virtual NS-Tree," that is, a single NS-Tree that acts as a single tree in order to perform consistency checks between two NS-Trees that are actually comprised of any number of partitions in any configuration. The creation of this virtual NS-Tree may be done dynamically and may adhere to the rules of entire tree validation or sub-tree validation (e.g., by specific sync time or time range), as described above.

Due to the contained nature of NS-Trees, consistency validation does not need to be isolated to separate nodes existing within a single data center. Indeed, these techniques may be applied across data centers that require data consistency validation and replication. Further, due to the unique nature of the NS-Tree indexes, there is no appreciable degradation in performance or efficiency as the amount of data increases.

FIG. 6 shows a flowchart 600 illustrating a technique for utilizing improved aggregate indexes for real-time verification of node contents, according to one or more embodiments disclosed herein. In block 610 of FIG. 6, data is inserted and/or modified into one or more tables in a node being monitored by the techniques described herein. The data may be stored in accordance with any desired data storage protocol. The collected data may be stored in the memory 430, on storage device 480, or elsewhere on or outboard of the system unit 410, including transmission from the computer 400 to an external device, e.g., a database 111.

In block 620, the NS-Tree index, e.g., as described in detail above, may be created and/or updated for each respective table, based on the insertion or modification of data referred to above in block 610. As mentioned above, the NS-Tree has the advantageous property that it may be scaled across the data shards and nodes of a distributed data management solution, while still maintaining the ability to validate consistency at any given moment and across any range of time.

In block 630, a verification request is received at one or more of the nodes of the system. In some such requests, a time range may be specified over which the user desires to know if two or more data sources are consistent. In other such requests, a user may desire to know if two or more data sources are consistent in their entireties (i.e., without respect to any specific sub-time interval).

In block 640, if the verification request finds a match between the data nodes being validated for consistency (over the requested time period), the process may proceed to block 650, wherein a successful consistency check is nearly immediately reported back to the user. If, instead, at block 640, the verification request finds that there is a mismatch between the data nodes being validated for consistency (over the requested time period), the process may proceed to block 660, wherein an unsuccessful consistency check is nearly immediately reported back to the user. After reporting back the status of the consistency verification check, the process may end.

Figure 7:
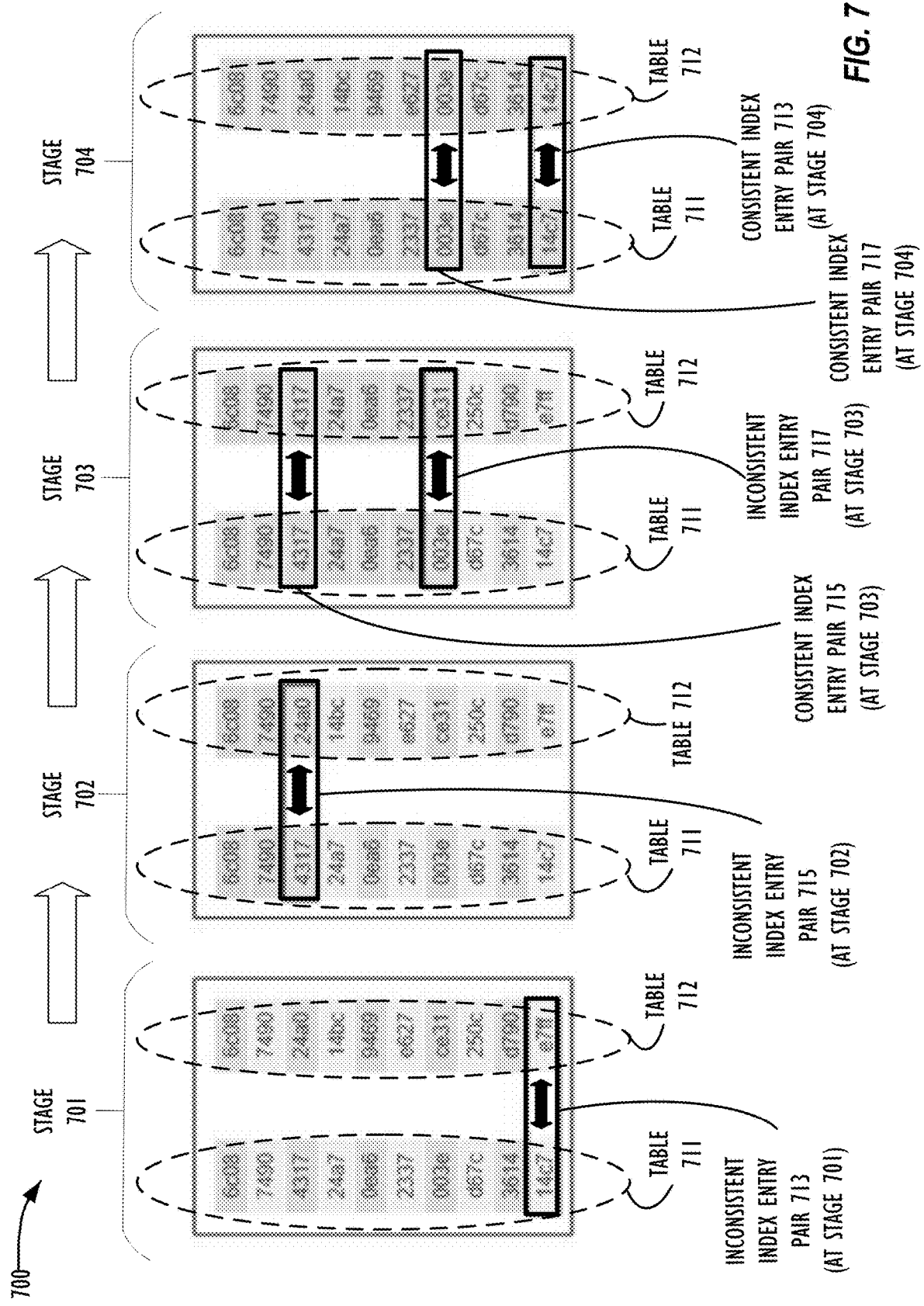
FIG. 7 is a sequence diagram illustrating a technique for synchronization of node contents, according to one or more embodiments disclosed herein.

FIG. 7 is a sequence diagram illustrating a technique 700 for synchronization of node contents, according to one or more embodiments disclosed herein. The synchronization technique 700 described below in connection with FIG. 7 can be performed by one or more of the logic/modules described above in connection with FIG. 1, 2, or 3.

At any desired point during operation, a logic/module performing technique 700 or a user of such logic/module can initiate, via an API, a determination into whether two or more records, tables, and/or node clusters are synchronized, e.g., as described above in connection with FIGS. 5-6. When, for one embodiment, the system detects an inconsistent synchronization aggregation, a user may be presented with an option (e.g., via an input/output device, etc.) to perform a synchronization in order to bring the records, tables, and/or node clusters into synchronization in terms of record content. For another embodiment, the logic/module automatically performs synchronization without presenting the option to a user.

There are various levels of synchronization and varying types of determinations used to decide what and when to perform synchronization. For one embodiment, the NS-Trees are evaluated and individual records are copied between tables as shown in FIG. 7. FIG. 7 illustrates a synchronization technique 700 that includes four stages 701-704. Here, each record has a computed hash value and its entry in the NS-Tree contains its sync time and aggregate from the beginning of the NS-Tree. For one embodiment, the NS-Tree is ordered by sync time and aggregate value. FIG. 7 illustrates a column of aggregate values associated with a first table 711 and a column of aggregate values associated with a second table 712. Each value in the columns corresponds to a record in the respective table and represents the calculated aggregate value stored in an index entry associated with that record. As explained above, the aggregate value of each index entry corresponds to an aggregate of hash values of records up to and including the record corresponding to the index entry (Note: not all values of each record must be included in the record's hash value as, in some embodiments, only those specified by the user are hashed for inclusion in the NS-Tree index). For the illustrated embodiment shown in FIG. 7, four-byte aggregate values are used, however, any type of aggregate values may be used. For example, one-byte aggregate values, two-byte aggregate values, five-byte aggregate values, eight-byte aggregate values, etc. In FIG. 7, the term "sync time" refers to a value assigned to each data record that reflects the time of the record's last addition or modification.

Technique 700 begins at Stage 701. The stage 701 includes evaluating whether the tables are synchronized. This evaluation can be automatically performed by a logic/module performing the technique 700 or in response to inputs provided by a user of such logic/module. In some embodiments, the operation in stage 701 for determining whether two tables are synchronized is virtually a free operation—that is, the logic/module performing technique 700 uses a negligible amount of computational resources to perform the determination operation. This is at least because the determination operation requires only a single read (by the logic/module performing technique 700) of the index entries located in an indicator position (i.e., indicator index entries) of the two NS-Trees associated with the tables to validate table consistency as explained above. In some embodiments, the indicator position corresponds to a root node of the NS-Tree index. In other implementations, the indicator position corresponds to a last entry the NS-Tree index. The last entry may be a right-most entry in a right-most leaf node of the NS-Tree index. In other implementations, the last entry corresponds to a left-most entry in a left-most leaf node of the NS-Tree index. In the example shown in FIG. 7, a single read of a last pair of index entries 713 at stage 701 is used to determine that the last pair of index entries 713 are inconsistent indicating that the tables 711 and 712 are inconsistent (i.e., not synchronized).

In response to the determination that the tables 711 and 712 are inconsistent, the technique 700 proceeds to stage 702. Here, the logic/module performing technique 700 implements a search algorithm (e.g., an N-ary search algorithm, etc.) of the NS-Tree indexes to detect a first pair of index entries in the NS-Tree indexes corresponding to the two tables 711 and 712 where the aggregate values are found to be inconsistent. In the example shown in FIG. 7, the first location is a corresponding pair of index entries 715 that are inconsistent at stage 702. Because the pair of entries prior to the pair 715 are consistent (e.g., have equivalent aggregate values), the system determines that the aggregates of the pair 715 are inconsistent because the records corresponding to the pair 715 are inconsistent.

Based on the type of synchronization operation to be performed on the tables 711 and 712 (e.g., single direction or bidirectional), the record values are modified, or new records are added to bring the tables 711 and 712 into synchronization. In the example shown in stage 703 of FIG. 7, one or both of the records corresponding to the pair of index entries 715 have been modified to make their corresponding aggregate values equal to each other. The logic/module performing the technique 700 modifies records or adds records by issuing a delete command or by initiating transfer of data between computing devices, virtual computing devices, or data structures hosting the tables, as described further below. Once the record values are corrected, the aggregate indexing algorithm (e.g., as described above in connection with FIG. 6) automatically adjusts the NS-Trees associated with the tables 711 and 712 to evaluate subsequent record values that follow the corrected/new record value(s).

At stage 703, the logic/module performing technique 700 further identifies the next pair of inconsistent records in the same manner described above in connection with stage 701. Once the next pair of inconsistent records is found, it is corrected in the same manner described above in connection with stage 702. For example, and as shown in stages 703-704 of FIG. 7, the index entry pair 717 (and all of the index entries that follow it) are identified as an inconsistent record pair. Accordingly, one or both of the records associated with the index entry pair 717 are corrected to be consistent with each other.

After each of the inconsistent records have been evaluated, technique 700 proceeds to stage 704. Here, the logic/module performing technique 700 evaluates the last pair of index entries 713 of the NS-Tree indexes corresponding to the tables 711 and 712 (or the last pair of index entries within a range specified to be synchronized). As explained above, the evaluation may be performed with a single read of the NS-Tree indexes. In the example of FIG. 7, the logic/module performing the technique 700 determines that the tables are synchronized based on a single read of the last pair of index entries 713 at stage 704 indicating that the aggregate values at the last pair of index entries 713 are equal to each other. The technique 700 ends after the logic/module performing technique 700 determines that the tables 711 and 712 (or table records within a specified range) are consistent. It should be noted that, while described as synchronizing two tables, the technique 700 may be used to synchronize portions of two tables.

The technique 700 may be faster and more efficient than other methods of synchronizing replicated nodes currently available. This is because: (i) the technique 700 requires minimal analysis to be performed in order to validate consistency; and (ii) quickly identifies specific inconsistent data (e.g., records, files, tables, etc.) to be modified, replaced, or deleted. Accordingly, the technique 700 may enable fewer queries to nodes to identify inconsistent data while not requiring large amounts of consistent data to be transferred to achieve synchronization. As described above in connection with stages 701-704, data can be synchronized in either a single directional mode or a bi-directional mode.

When operating according to the single direction mode, the logic/module performing the technique 700 synchronizes two tables by modifying a "secondary" table (e.g., the table 712) of the two tables to match a "primary" table (e.g., the table 711) of the two tables 711 and 712. In response to determining that new record in the primary table is not found in the secondary table, the logic/module is configured to initiate transmission of the new record to the secondary table. In response to determining that a first record in the primary table and a second record in the secondary table have the same primary key but different content, the logic/module is configured to initiate modification of the content of the second record to match the content of the first record. In response to determining that a record included in the secondary table is not found in the primary table, the logic/module is configured to initiate removal of the record from the secondary table. In some implementations, prior to individual record synchronization, the logic/module is configured to initiate transfer of entire partition files in the primary table that are not located in the secondary table to the secondary table. For example, the logic/module may initiate transfer of an entire time-based partition in response to determining that copying the entire partition is more efficient (e.g., in terms of time and/or network bandwidth) than updating individual records. This can assist with avoiding writing individual records during synchronization, which can improve usage of computational resources. After transfer of the partition files, the logic/module may begin individual record synchronization for a specified time range or the entire two tables.

When operating according to the bi-direction mode, the logic/module performing the technique 700 synchronizes two tables by bi-direction synchronization is used in technique 700, the operations are as follows: The logic/module performing technique 700 is configured to write any new records that are not present in the secondary table but are in the primary table to the secondary table. The logic/module performing technique 700 is further configured to write any new records that are not present in the primary table but are in the secondary table to the primary table. In response to determining that records having the same primary key but different content, the logic/module is configured to treat the record having the most recent sync time as the master record and use it to update the other record. In response to determining that records have the same primary key and the same sync times but different content, the logic/module is configured to update the record stored in the secondary table based on the record stored in the primary table. In some implementations, prior to individual record synchronization, the logic/module is configured to copy entire partition files from the primary table that are not present in the secondary table to the secondary table before beginning individual record synchronization. In some implementations, prior to individual record synchronization, the logic/module is configured to copy entire partition files from the secondary table that are not present in the primary table to the primary table prior to beginning individual record synchronization. After transfer of the partition files, the logic/module may begin individual record synchronization for a specified time range or the entire two tables.

Figure 8:
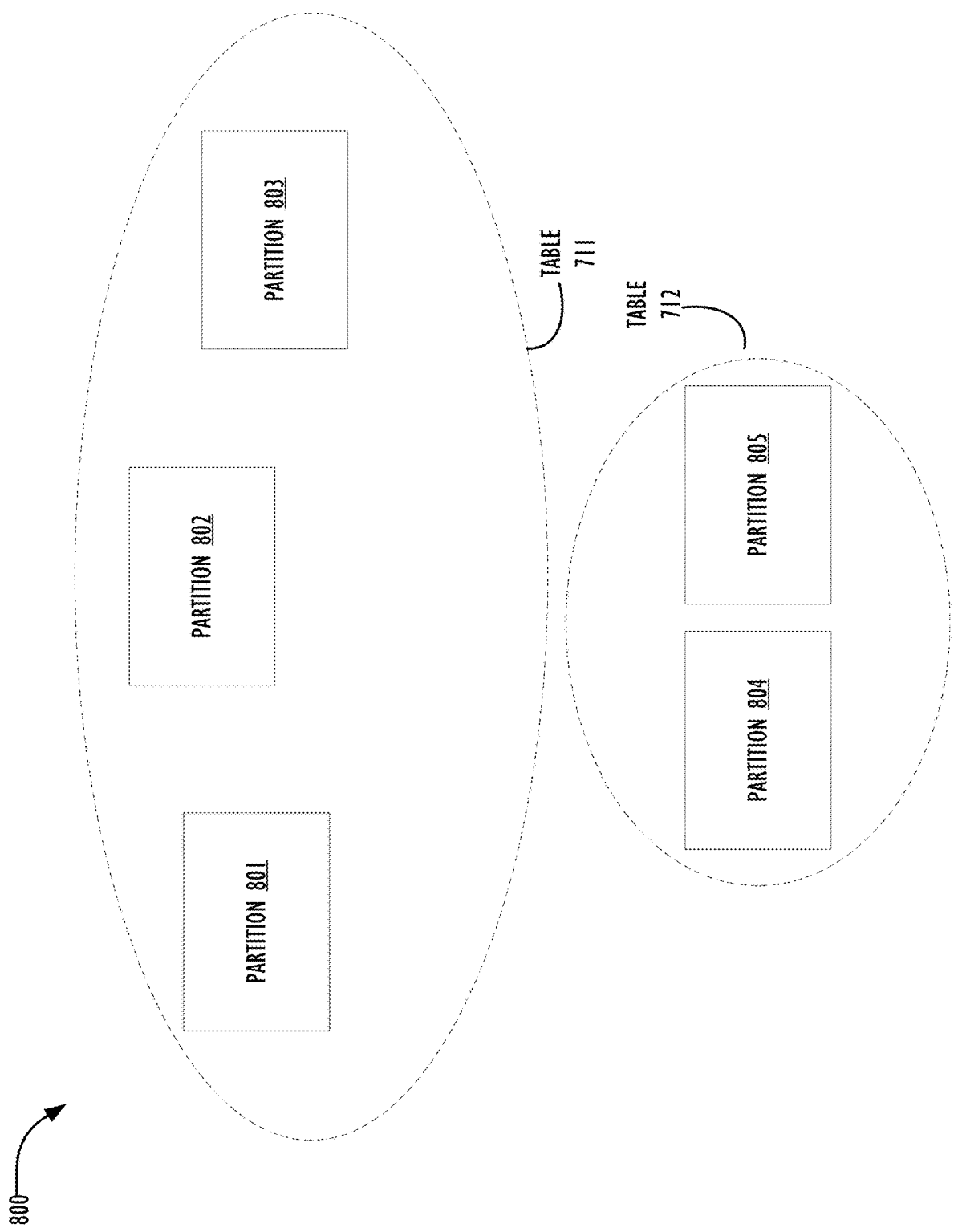
FIG. 8 is a block diagram illustrating a computer system comprising multiple partitions that can be used to form a virtual master tree for synchronization of node contents, according to one or more embodiments disclosed herein.

FIG. 8 is a block diagram illustrating a diagram 800 of the tables 711 and 712 composed of multiple partitions 801-805. As explained above, the synchronization techniques described herein (e.g., technique 700, etc.) can be performed against dimension tables and partitioned tables (such as time partitioned tables). As explained above, a system may maintain a single NS-Tree index per dimension table. The system use the single NS-Tree (or a portion thereof) and an NS-Tree associated with another dimension table to validate consistency of the dimension table with the other dimension table. The dimension tables may further be synchronized according to the techniques described above.

As illustrated in FIG. 8, the tables 711 and 712 are partitioned tables. Accordingly, each of the tables 711 and 712 includes one or more data partitions. In the illustrated example, the table 711 includes the partitions 801-803 and the table 712 includes the partitions 804-805. In some cases, a partition of a table may replicate data from one or more other partitions in the table. For example, the partition 802 may replicate data from the partition 801 and the partition 803. Partitions within a table may be stored at different nodes of a data cluster. To illustrate, the partitions 801 and 802 may be stored at different nodes (e.g., physical or virtual devices). In the case of partitioned tables, a system may maintain an NS-Tree index for each partition. Accordingly, the partitions 801-805 may each have a separate NS-Tree index. In operation, a user or logic/module can specify a time range of data to synchronize between the tables 711-712. In cases where the time range includes data from more than one partition (e.g., from both the partition 801 and the partition 802), the logic/module generates a virtual NS-Tree index based on the NS-Tree-indexes of the partitions. Thus, in an example in which the logic/module receives or generates a request to verify synchronization of data for a time range that includes the partitions 801-803 in the table 711 and the partitions 804 and 805 in the table 712, the logic/module generates a first virtual NS-Tree index based on the NS-Tree indexes of the partitions 801-803 and a second virtual NS-Tree index based on the partitions 804-805. The logic/module may then determine consistency and synchronize the tables 711 and 712 for the time range using the two virtual NS-Tree indexes according to the techniques (e.g., the technique 700) described above.

As is known, one or more currently available synchronization techniques require table locking or file shutdown during synchronization. In contrast, and for one embodiment, a logic/module performing the synchronization technique(s) described herein (e.g., technique 700, etc.) can optionally perform synchronization of data in a live mode. For example, the logic/module or a user of the logic/module can specify (e.g., via an API call) that the table be kept open during synchronization. In some implementations, the logic/module determines to enable concurrent writes and synchronization of a dataset based on a size of the dataset, based on frequency of access to the dataset, or a combination thereof. For example, the logic/module may determine to enable concurrent writes and synchronization to the dataset in response to determining that frequency of access to the dataset falls below a threshold for the size of the dataset. In such a scenario, a live synchronization is performed without any table locking or file shutdown. In other examples, data tables contain that contain time partitioned data may be synchronized according to a partial live synchronization process. In the partial live synchronization process, partitions participating in the sync process (e.g., corresponding to a specified synchronization time range) may be locked or shut down, while other partitions remain unlocked and active for concurrent insertions or modifications. This can assist with improving large scale, data management technologies, which generated or acquire data generated that need real-time management and analysis.

Live synchronization may be implemented in some cases due to the fact that NS-Trees can be maintained dynamically so that the synchronization techniques described herein (e.g., technique 700, etc.) can be used in or near real-time. More specifically, when an NS-Tree changes in the middle of a synchronization (e.g., due to a data write), a logic/module performing the synchronization techniques described herein (e.g., technique 700, etc.) can process and re-adjust the synchronization being performed to direct modification, addition, or deletion of data to the necessary locations. As explained above, a system may determine whether to perform live synchronization based on the frequency of modifications, additions, and/or deletions that a table experiences. For a first example, live synchronization of a table that is entirely unlocked may or may not be an advisable option for fact or dimension tables that experience frequent concurrent modifications (depending on their use). For a second example, live synchronization of a table that is entirely unlocked may or may not be an advisable option when modifications are less frequent. The ability to use live synchronization can assist with maintaining high availability in a large scale distributed system.

For one embodiment, one or more embodiments of an NS-Tree (and the corresponding techniques associated with the NS-Trees) can be implemented as part of database management system. A non-limiting example of a database management system is included in McAfee® Security Information & Event Management (STEM) solution.

Program instructions may be used to cause a general-purpose or special-purpose processing system that is programmed with the instructions to perform one or more of the operations described herein. Alternatively, the operations may be performed by specific hardware components that contain hardwired logic for performing the operations, or by any combination of programmed computer components and custom hardware components. The methods described herein may be provided as a computer program product that may include a machine-readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

MCAFEE is a registered trademark of McAfee LLC. These and any other marks referenced herein may be common law or registered trademarks of third parties affiliated or unaffiliated with the applicant or the assignee. Use of these marks is by way of example and shall not be construed as descriptive or to limit the scope of the embodiments described herein to material associated only with such marks.

What is claimed is:

1. A machine readable storage disk or storage device storing instructions, the stored instructions comprising instructions for facilitating synchronization of data that, when executed by a machine, cause the machine to:
   receive data indicative of a first table and a second table that corresponds to the first table, the received data including a pair of indexes including:
      a first index of records in the first table including a plurality of the first index entries, wherein
         each first index entry includes a first aggregate value associated with data of a respective record in the first table, the first aggregate value to represent accumulated values of prior first index entries of each first index entry; and
      a second index of records in the second table including a plurality of second index entries, wherein
         each second index entry includes a second aggregate value associated with data of a respective record in the second database, the aggregate value to represent accumulated values of prior second index entries of each second index entry;
   determine that the first table is inconsistent with the second table based on a comparison of aggregate values of a pair of indicator index entries of the pair of indexes, wherein the pair of indicator index entries include a last index entry in the first index and a corresponding last index entry in the second index;
   identify a first pair of corresponding index entries from the pair of indexes for which aggregate values of the first pair of corresponding index entries are inconsistent, wherein the first pair of corresponding index entries being different than the pair of indicator index entries;
   synchronize records corresponding to the first pair of corresponding index entries, wherein the first and second tables are locked prior to the synchronizing of the records;
   update the aggregate values of the pair of indicator index entries; and
   verify the updated aggregate values of the pair of indicator index entries to determine that the first table and the second table are consistent.

2. The machine readable storage disk or storage device of claim 1, wherein the pair of indexes correspond to B-tree data structures.

3. The machine readable storage disk or storage device of claim 1, wherein each index entry of the pair of indexes further includes a hash value associated with the data of the respective record.

4. The machine readable storage disk or storage device of claim 3, wherein the aggregate value of each index entry in the first index corresponds to an aggregate of the hash value of the each index entry and hash values of previous entries in the first index.

5. The machine readable storage disk or storage device of claim 3, wherein each index entry of the pair of indexes further includes:
   a time value associated with the respective record of the index entry; and
   a primary key associated with the respective record of the index entry.

6. The machine readable storage disk or storage device of claim 1, wherein at least one of the first and second tables includes multiple partitions.

7. The machine readable storage disk or storage device of claim 1, wherein the instructions, when executed, cause the machine to delete data not found in the first table from the second table.

8. The machine readable storage disk or storage device of claim 1, wherein the instructions, when executed, cause the machine to add data from the first table to the second table and to add data from the second table to the first table.

9. A method comprising:
   receiving data indicative of a first table and a second table that corresponds to the first table, the received data including a pair of indexes including:
      a first index of records in the first table including a plurality of first index entries, wherein
         each first index entry includes a first aggregate value associated with data of a respective record in the first table, the first aggregate value to represent accumulated values of prior first index entries of each first index entry; and
      a second index of records in the second table including a plurality of second index entries, wherein
         each second index entry includes a second aggregate value associated with data of a respective record in the second database, the aggregate value to represent accumulated values of prior second index entries of each second index entry;
   determining that the first table is inconsistent with the second table based on a comparison of aggregate values of a pair of indicator index entries of the pair of indexes, wherein the pair of indicator index entries include a last index entry in the first index and a corresponding last index entry in the second index;
   identifying a first pair of corresponding index entries from the pair of indexes for which aggregate values of the first pair of corresponding index entries are inconsistent, wherein the first pair of corresponding index entries being different than the pair of indicator index entries;
   synchronizing records corresponding to the first pair of corresponding index entries, wherein the first and second tables are locked prior to the synchronizing of the records;
   updating the aggregate values of the pair of indicator index entries; and
   verifying the updated aggregate values of the pair of indicator index entries to determine that the first table and the second table are consistent.

10. The method of claim 9, wherein the pair of indexes correspond to B-tree data structures.

11. The method of claim 9, wherein each index entry of the pair of indexes further includes a hash value associated with the data of the respective record.

12. The method of claim 11, wherein the aggregate value of each index entry in the first index corresponds to an aggregate of the hash value of the each index entry and hash values of previous entries in the first index.

13. The method of claim 11, wherein each index entry of the pair of indexes further includes:
a time value associated with the respective record of the index entry; and
a primary key associated with the respective record of the index entry.

14. The method of claim 9, wherein at least one of the first and second tables includes multiple partitions.

15. The method of claim 9, wherein the synchronizing of the records corresponding to the first pair of corresponding index entries includes deleting data not found in the first table from the second table.

16. The method of claim 9, wherein the synchronizing of the records corresponding to the first pair of corresponding index entries includes adding data from the first table to the second table and adding data from the second table to the first table.

17. An apparatus comprising:
one or more processors; and
a memory storing instructions, when executed by the one or more processors, cause the one or more processors to perform operations including:
receiving data indicative of a first table and a second table that corresponds to the first table, the received data including a pair of indexes including:
a first index of records in the first table including a plurality of first index entries, wherein each first index entry includes a first aggregate value associated with data of a respective record in the first table, the first aggregate value to represent accumulated values of prior first index entries of each first index entry; and
a second index of records in the second table including a plurality of second index entries, wherein each second index entry includes a second aggregate value associated with data of a respective record in the second database, the aggregate value to represent accumulated values of prior second index entries of each second index entry;
determining that the first table is inconsistent with the second table based on a comparison of aggregate values of a pair of indicator index entries of the pair of indexes, wherein the pair of indicator index entries include a last index entry in the first index and a corresponding last index entry in the second index;
identifying a first pair of corresponding index entries from the pair of indexes for which aggregate values of the first pair of corresponding index entries are inconsistent, wherein the first pair of corresponding index entries being different than the pair of indicator index entries;
synchronizing records corresponding to the first pair of corresponding index entries, wherein the first and second tables are locked prior to the synchronizing of the records;
updating the aggregate values of the pair of indicator index entries; and
verifying the updated aggregate values of the pair of indicator index entries to determine that the first table and the second table are consistent.

* * * * *